(12) United States Patent
Double et al.

(10) Patent No.: US 9,969,895 B2
(45) Date of Patent: May 15, 2018

(54) PRINTING PROCESS

(71) Applicant: Fujifilm Imaging Colorants, Inc., New Castle, DE (US)

(72) Inventors: Philip John Double, Manchester (GB); Christopher Oriakhi, New Castle, DE (US); Ravi Shankar, New Castle, DE (US)

(73) Assignee: Fujifilm Imaging Colorants, Inc., New Castle, DE (US)

( * ) Notice: Subject to any disclaimer, the term of this patent is extended or adjusted under 35 U.S.C. 154(b) by 0 days. days.

(21) Appl. No.: 15/325,490

(22) PCT Filed: Jun. 25, 2015

(86) PCT No.: PCT/GB2015/051844
§ 371 (c)(1),
(2) Date: Jan. 11, 2017

(87) PCT Pub. No.: WO2016/005727
PCT Pub. Date: Jan. 14, 2016

(65) Prior Publication Data
US 2017/0158896 A1   Jun. 8, 2017

(30) Foreign Application Priority Data
Jul. 11, 2014   (GB) .................................. 1412376.4

(51) Int. Cl.
| | | |
|---|---|---|
| *C09D 11/326* | (2014.01) | |
| *C09D 11/38* | (2014.01) | |
| *C09D 5/14* | (2006.01) | |
| *C09D 11/322* | (2014.01) | |
| *C09D 11/324* | (2014.01) | |
| *C09D 11/40* | (2014.01) | |
| *B41J 2/01* | (2006.01) | |
| *C09D 11/03* | (2014.01) | |

(52) U.S. Cl.
CPC ............... *C09D 11/326* (2013.01); *B41J 2/01* (2013.01); *C09D 5/14* (2013.01); *C09D 11/03* (2013.01); *C09D 11/322* (2013.01); *C09D 11/324* (2013.01); *C09D 11/38* (2013.01); *C09D 11/40* (2013.01)

(58) Field of Classification Search
CPC .................................................... C09D 11/326
See application file for complete search history.

(56) References Cited

U.S. PATENT DOCUMENTS

| | | |
|---|---|---|
| 7,714,076 B2 | 5/2010 | Krepski et al. |
| 8,087,357 B2 | 1/2012 | Denome et al. |
| 8,757,062 B2 | 6/2014 | Content et al. |
| 8,764,177 B2 | 7/2014 | Annable et al. |
| 9,040,620 B2 | 5/2015 | Annable et al. |
| 9,127,178 B2 | 9/2015 | Cordwell et al. |
| 9,267,044 B2 | 2/2016 | Annable et al. |
| 9,309,425 B2 | 4/2016 | Popat et al. |
| 2003/0104969 A1* | 6/2003 | Caswell .................... A47F 1/08 510/513 |
| 2008/0002004 A1* | 1/2008 | O'Donnell .......... B01F 17/0028 347/86 |
| 2008/0311299 A1* | 12/2008 | Furukawa .................. B41J 3/44 427/261 |
| 2015/0132545 A1 | 5/2015 | O'Donnell et al. |
| 2016/0032118 A1 | 2/2016 | Morris et al. |
| 2016/0032119 A1 | 2/2016 | Morris et al. |

FOREIGN PATENT DOCUMENTS

| | | |
|---|---|---|
| WO | 2006/064193 A1 | 6/2006 |
| WO | 2008/004198 A2 | 1/2008 |
| WO | 2009/120420 A1 | 10/2009 |
| WO | 2010/038071 A1 | 4/2010 |
| WO | 2011/051711 A1 | 5/2011 |
| WO | 2012/153119 A1 | 11/2012 |

OTHER PUBLICATIONS

International Preliminary Report on Patentability dated Jan. 26, 2017, issued from corresponding PCT/GB2015/051844.

* cited by examiner

*Primary Examiner* — Shelby Fidler
(74) *Attorney, Agent, or Firm* — Banner & Witcoff, Ltd.

(57) ABSTRACT

A process for printing on a water-soluble material using a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups. Also inks, ink-sets, printed material and ink-jet printers.

16 Claims, No Drawings

PRINTING PROCESS

RELATED APPLICATIONS

This application is a National Stage Application under 35 U.S.C. 371 of co-pending PCT application PCT/GB2015/051844 designating the United States and filed Jun. 25, 2015; which claims the benefit of GB application number 1412376.4 and filed Jul. 11, 2014 each of which are hereby incorporated by reference in their entireties.

This invention relates to a printing process, inks for ink-jet printing, ink-jet ink containers, ink sets and printed material.

Agrochemicals, water-treatment chemicals, detergents and the like are commonly supplied in unit-dose pouches where the active chemical is contained within a water-soluble (usually polyvinyl alcohol) film. Increasingly regulatory authorities are requiring that each of these unit-dose soluble packages are individually labelled. Thus, for example, it is proposed that in the EU that any detergent unit-dose package containing more than 25 ml of an irritant or corrosive chemical will need to be individually labelled. Such pouches make up approximately 85% of the European detergent pouch market.

Printing on the individual pouches may be done either on the web of film before the pouch has been made, when the image can be printed on either side of the film so that it ends up inside or outside the finished pouch, or after the pouch has been made when the image is on the outside of the pouch.

Detergent pouches can be produced either on rotary drum machines such as those produced by Cloud Packaging Equipment, Eme Engel Machinefabriek en Engineering B.V. or Green Sustainable Packaging Inc. Pouches can also be produced on a flat bed machine such as those produced by Harro Hofliger Verpackungsmaschinen GmbH. On rotary drum machines ink-jet printers can be installed on either one of the webs feeding the machine or placed to print on the formed pouches.

The colorants for use in printing on these water-soluble materials must meet many demanding criteria. Thus, they must display excellent adhesion to water-soluble materials (such as polyvinyl alcohol), they must give clear images with good scuff and scratch resistance and crucially they must be able to readily disperse/dissolve in water without leaving any residue or ink skin. It has been found that pigments give excellent performance.

Since the colorant must dissipate when the water-soluble pouch dissolves the pigments (which are in their native state insoluble) must be in a form able to readily disperse.

There are a number of different treatments which enable pigments to be self-dispersible. However, this technology is usually aimed at providing a pigment which can form a stable dispersion in a defined liquid medium. Dispersing a self-dispersible pigment in a defined liquid medium, such as an ink or paint, typically requires careful processing and the selection of solvents and other additives able to help disperse and stabilise the pigment.

This is a very different challenge to providing a pigment able to completely and rapidly self disperse at room temperature in an aqueous environment and existing commercially available self-dispersible pigments are not able to satisfactorily disperse without leaving an undesirable residue.

The applicants have identified a particular form of a self-dispersible pigment which when printed onto a water-soluble material is able to disperse when the film dissolves without leaving any unwanted residue.

Thus, the present invention is concerned with a process for printing on a water-soluble material using a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups.

The self-dispersible pigment is preferably derived from any of the classes of pigments described in the Third Edition of the Colour Index (1971) and subsequent revisions of, and supplements thereto, under the chapter headed "Pigments".

Examples of suitable organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although often regarded as being inorganic, behaves more like an organic pigment in its dispersing properties and is also suitable. Preferred organic pigments are phthalocyanines, especially copper phthalocyanine pigments, azo pigments, indanthrones, anthanthrones, quinacridones and carbon black pigments.

The pigment is preferably a yellow, cyan, magenta, red, green, blue or black pigment. The pigment may be a single chemical species or a mixture comprising two or more chemical species (e.g. a mixture comprising two or more different pigments). In other words, two or more different pigments solids may be used in the process of the present invention. Preferably the pigment is a yellow, cyan, magenta, red, or black pigment More preferably the self-dispersible pigment comprises one or more of Carbon Black; Pigment Blue 15:3; Pigment Yellow 74 and Pigment Red 122.

The dispersant, prior to crosslinking with the crosslinking agent, preferably has an acid value of at least 125 mg KOH/g.

The dispersant preferably has one or more oligomeric dispersing groups.

In order to provide water-dispersibility, the polymer-encapsulated pigment particles preferably have carboxy groups (i.e. not all of the carboxy groups in the dispersant are crosslinked to form the polymer-encapsulated pigment particles).

The polymer-encapsulated pigment particles may be prepared by crosslinking some of the carboxy groups in a carboxy-functional dispersant in the presence of a pigment and a crosslinking agent, preferably at a temperature of less than 100° C. and/or a pH of at least 6. Such crosslinking is usually performed in an aqueous medium, for example in a mixture comprising water and organic solvent. Suitable mixtures comprising water and organic solvent are as described above in relation to the ink.

Preferably, the polymer-encapsulated pigment particles have a Z-average particle size of less than 500 nm, more preferably from 10 to 400 nm and especially from 15 to 300 nm.

The Z-average particle size may be measured by any means, but a preferred method is by photo correlation spectroscopy devices available from Malvern® or Coulter®.

Preferably the carboxy-functional dispersant comprises benzyl methacrylate.

A preferred carboxy-functional dispersant is a copolymer comprising one or more hydrophobic ethylenically unsaturated monomers (preferably at least half of which by weight is benzyl methacrylate), one or more hydrophilic ethylenically unsaturated monomers having one or more carboxy groups; and optionally some or no hydrophilic ethylenically unsaturated monomers having one or more hydrophilic non-ionic groups.

An especially preferred carboxy-functional dispersant is a copolymer comprising:
(i) from 75 to 97 parts of one or more hydrophobic ethylenically unsaturated monomers comprising at least 50 parts of benzyl methacrylate;
(ii) from 3 to 25 parts of one or more hydrophilic ethylenically unsaturated monomers having one or more carboxy groups; and
(iii) 0 to 1 part of hydrophilic ethylenically unsaturated monomers having one or more hydrophilic non-ionic groups;
wherein the parts are by weight.

Typically and the sum of the parts (i), (ii) and (iii) adds up to 100.

It is preferred that the only hydrophobic ethylenically unsaturated monomer in component (i) is benzyl methacylate.

More preferably the carboxy-functional dispersant is a copolymer comprising:
(i) from 80 to 93 parts of one or more hydrophobic ethylenically unsaturated monomers comprising at least 50 parts benzyl methacrylate;
(ii) from 7 to 20 parts of one or more hydrophilic ethylenically unsaturated monomers having one or more carboxy groups;
(iii) 0 to 1 part of hydrophilic ethylenically unsaturated monomers having a hydrophilic non-ionic group;
wherein the parts are by weight.

Typically and the sum of the parts (i), (ii) and (iii) adds up to 100.

Preferably the hydrophobic monomers have no hydrophilic groups, whether ionic or non-ionic. For example, they are preferably free from water-dispersing groups.

Preferably, the hydrophobic ethylenically unsaturated monomers have a calculated log P value of at least 1, more preferably from 1 to 6, especially from 2 to 6.

A review by Mannhold, R. and Dross, K. (Quant. Struct-Act. Relat. 15, 403-409, 1996) describes how to calculate log P values.

Preferred hydrophobic ethylenically unsaturated monomers are styrenic monomers (e.g. styrene and alpha methyl styrene), aromatic (meth)acrylates (especially benzyl (meth) acrylate), $C_{1-30}$-hydrocarbyl (meth)acrylates, butadiene, (meth)acrylates containing poly($C_{3-4}$)alkylene oxide groups, (meth)acrylates containing alkylsiloxane or fluorinated alkyl groups and vinyl naphthalene.

Preferably, the dispersant comprises the repeat units from copolymerising from 75 to 97, more preferably from 77 to 97, especially from 80 to 93 and most especially from 82 to 91 parts by weight of component (i).

Dispersants comprising at least 50 parts of benzyl (meth) acrylate monomer repeat units can provide polymer-encapsulated pigment dispersions with good stability and good optical density.

Component (i) preferably comprises at least 60 parts, more preferably at least 70 and especially at least 80 parts by weight of benzyl (meth)acylate. The remainder required to obtain the overall preferred amounts of hydrophobic monomers may be provided by any one or more of the above hydrophobic monomers other than benzyl (meth)acrylate. Preferably, benzyl (meth)acrylate is benzyl methacrylate (rather than benzyl acrylate).

In a preferred embodiment component (i) comprises only benzyl (meth)acrylate, more preferably only benzyl methacrylate.

Preferably, the monomers in component (ii) have a calculated log p value of less than 1, more preferably from 0.99 to -2, especially from 0.99 to 0 and most especially from 0.99 to 0.5, when calculated in the un-neutralised (e.g. free acid) form.

Preferred hydrophilic ethylenically unsaturated monomers for component (ii) having one or more carboxylic acid groups include beta carboxyl ethyl acrylate, itaconic acid, maleic acid, fumaric acid, crotonic acid, more preferably acrylic acid and especially methacrylic acid. Preferably, these ethylenically unsaturated monomers when polymerised provide the only ionic groups in the dispersant.

In a preferred embodiment component (ii) is or comprises methacrylic acid.

Preferably, the dispersant comprises the repeat units from copolymerising 3 to 25, more preferably 3 to 23, especially 7 to 20 and most especially 9 to 18 parts by weight of component (ii). This is especially so when component (ii) comprises, or more preferably is, methacrylic acid.

For the purposes of the present invention a monomer having both ionic and non-ionic hydrophilic groups is considered to belong to component (iii). Thus, all the ethylenically unsaturated monomers in component (ii) are free from hydrophilic non-ionic groups.

Preferably, the monomers in component (iii) have calculated log P values of less than 1, more preferably of from 0.99 to -2.

Preferably, component (iii) is less than 1 part, more preferably less than 0.5 parts, especially less than 0.1 parts and most especially 0 parts (i.e. absent). In this way the dispersant contains no repeat units from hydrophilic monomers having one or more hydrophilic non-ionic groups.

Examples of hydrophilic non-ionic groups include polyethyleneoxy, polyacrylamide, polyvinyl pyrrolidone, hydroxy functional celluloses and poly vinyl alcohol. The most common ethylenically unsaturated monomer having a hydrophilic non-ionic group is polyethyleneoxy (meth) acrylate.

In embodiments where repeat units from component (iii) are present in the dispersant (for example 1 part by weight of component (iii)) then in one embodiment the amount of component (iii) is deducted from the preferred amounts of component (i). In this way the amounts of all the components (i), (ii) and (iii) still adds up to 100. Thus for embodiments where 1 part by weight of component (iii) is present the preferred amounts of component (i) expressed above would become from 74 to 96 (75-1 to 97-1), more preferably from 76 to 96 (77-1 to 97-1), especially from 79 to 92 (80-1 to 93-1) and most especially from 81 to 90 (82-1 to 91-1) parts by weight of component (i). In an another embodiment it is possible to deduct the amount of component (iii) from the preferred amounts of component (ii) so that again the sum of the amounts of components (i), (ii) and (III) adds up to 100 parts by weight.

The function of the carboxylic acid group(s) in the dispersant is primarily to cross-link with the crosslinking agent and to provide the subsequent polymer-encapsulated pigment particles with the ability to disperse in aqueous ink media. Where carboxylic acid group(s) are the only groups for stabilising the polymer-encapsulated pigment particles in the aqueous medium it is preferable to have a molar excess of carboxylic acid groups to carboxy-reactive groups (e.g. epoxy groups) in the crosslinking agent to ensure that unreacted carboxylic acid groups remain after the crosslinking reaction has been completed. In one embodiment the ratio of moles of carboxylic acid groups to moles of carboxy-reactive groups (e.g. epoxy groups) in the crosslinking agent is preferably from 10:1 to 1.1:1, more preferably from 5:1 to 1.1:1 and especially preferably from 3:1 to 1.1:1.

The dispersant may optionally have other stabilising groups. The choice of the stabilising groups as well as the amounts of such groups will depend to a large extent on the nature of the aqueous medium.

In embodiments where the crosslinking agent has one or more oligomeric dispersing group the dispersant preferably has an acid value of at least 125 mg KOH/g.

The acid value of the dispersant, prior to crosslinking with the crosslinking agent, is preferably from 130 to 320 and more preferably from 135 to 250 mg KOH/g. We have found that dispersants having such acid values provide resultant polymer-encapsulated pigment particles which exhibit good stability in aqueous inks and also have sufficient carboxy groups for subsequent crosslinking with the crosslinking agent. Preferably, the dispersant (prior to crosslinking) has a number average molecular weight of from 500 to 100,000, more preferably from 1,000 to 50,000 and especially from 1,000 to 35,000. The molecular weight may be measured by gel permeation chromatography.

The dispersant need not be totally soluble in the liquid medium used to make the polymer-encapsulated pigment particles. That is to say perfectly clear and non-scattering solutions are not essential. The dispersant may aggregate in surfactant-like micelles giving slightly hazy solutions in the liquid medium. The dispersant may be such that some proportion of the dispersant tends to form a colloid or micellar phase. It is preferred that the dispersant produces uniform and stable dispersions in the liquid medium used to make the polymer-encapsulated pigment particles which do not settle or separate on standing.

It is preferred that the dispersant is substantially soluble in the liquid medium used to make the polymer-encapsulated pigment particles, giving rise to clear or hazy solutions.

Preferred random polymeric dispersants tend to give clear compositions whilst less preferred polymeric dispersants with two or more segments tend to give rise to the aforementioned hazy compositions in liquid media.

Typically the dispersant adsorbs onto the pigment prior to crosslinking so as to form a relatively stable dispersion of the pigment particles. This dispersion is then crosslinked using the crosslinking agent to form the polymer-encapsulated pigment particles. This pre-adsorption and pre-stabilisation in particular distinguishes the present invention from coacervation approaches whereby a polymer or pre-polymer (which is not a dispersant) is mixed with a pigment, a liquid medium and the crosslinking agent and only during or after crosslinking does the resultant cross-linked polymer precipitate onto the pigment.

In embodiments where the dispersant has an acid value of at least 125 mg KOH/g the crosslinking agent may have no oligomeric dispersing groups, but preferably the crosslinking agent has one or more oligomeric dispersing groups.

Crosslinking agents having one or more oligomeric dispersing group increase the stability of the polymer-encapsulated pigment particles in the ink.

The oligomeric dispersing group preferably is or comprises polyalkyleneoxide, more preferably a $polyC_{2-4}$-alkyleneoxide and especially a polyethyleneoxide. The polyalkyleneoxide groups provide steric stabilisation which improves the stability of the resulting encapsulated pigment.

Preferably the polyalkyeneoxide contains from 3 to 200, more preferably from 5 to 50 alkyleneoxide and especially from 5 to 20 alkyleneoxide repeat units.

The crosslinking agent preferably has at least two epoxy groups.

Preferred crosslinking agents having two epoxy groups and zero oligomeric dispersing groups are ethylene glycol diglycidyl ether, resorcinol diglycidyl ether, neopentyl glycol diglycidyl ether, 1,6-hexanediol diglycidyl ether, hydrogenated bisphenol A diglycidyl ether and polybutadiene diglycidyl ether.

Preferred crosslinking agents having two epoxy groups and one or more oligomeric dispersing groups are diethylene glycol diglycidyl ether, poly ethylene glycol diglycidyl ether, dipropylene glycol diglycidyl ether and poly propylene glycol diglycidyl ether.

Preferred crosslinking agents having three or more epoxy groups and zero oligomeric dispersing groups are sorbitol polyglycidyl ether, polyglycerol polyglycidyl ether, pentaerythritol polyglycidyl ether, diglycerol polyglycidyl ether, glycerol poly glycidyl ether and trimethylolpropane polygycidyl ether.

In one embodiment the epoxy crosslinking agent has zero oligomeric dispersing groups.

Examples of oxetane crosslinking agents include 1,4-bis[(3-ethyl-3-oxetanylmethoxymethyl)]benzene, 4,4'-bis[(3-ethyl-3-oxetanyl)methoxy]benzene, 1,4-bis[(3-ethy-3-oxetanyl)methoxyl-benzene, 1,2-bis[(3-ethyl-3-oxetanyl)-methoxy]benzene, 4,4-bis[(3-ethyl-3-oxetanyl)methoxy]biphenyl and 3,3',5,5'-tetramethyl-[4,4'-bis(3-ethyl-3-oxetanyl)methoxy]biphenyl.

Examples of carbodiimide crosslinking agents include crosslinker CX-300 from DSM NeoResins. Carbodiimide crosslinking agents having good solubility or dispersibility in water may also be prepared as described in U.S. Pat. No. 6,124,398, synthetic Examples 1 to 93.

Examples of isocyanate crosslinking agents include isophorone diisocyanate, hexamethylene diisocyanate, toluene diisocyanate, methylene diphenyl diisocyanate, methylene dicyclohexyl diisocyante, 2-methyl-1,5-pentane diisocyanate, 2,2,4-trimethyl-I,6-hexane diisocyante and 1,12-dodecane diisocyanate, 1,11-diisocyanatoundecane, 1,12-diisocyanatododecane, 2,2,4- and 2,4,4-trimethyl-1,6-diisocyanatohexane, 1,3-diisocyanatocyclobutane, 4,4'-bis-(isocyanatocyclohexyl)-methane, hexamethylene diisocyanate, 1,2-bis-(isocyanatomethyl)-cyclobutane, 1,3- and 1,4-bis-(isocyanatomethyl)cyclohexane, hexahydro-2,4-and/or-2,6-diisocyanatoluene, 1-isocyanato-2-isocyanatomethyl cyclopentane, 1-isocyanato-3-isocyanatom ethyl-3,5,5-trim ethyl-cyclohexane, 2,4'-dicyclohexylmethane diisocyanate, and 1-isocyanato-4(3)-isocyanatomethyl-1-methyl cyclohexane, tetramethyl-1,3- and/or -1,4-xylylene diisocyanate, 1,3- and/or 1,4-phenylene diisocyanate, 2,4- and/or 2,6-toluene diisocyanate, 2,4- and/or 4,4'-diphenyl-methane diisocyanate, 1,5-diisocyanatonaphthalene, and p-xylylene diisocyanate. Suitable diisocyanates are also understood to include those containing modification groups such as biuret, uretdione, isocyanurate, allophanate and/or carbodiimide groups, as long as they contain two or more isocyanate groups. For isocyanates the liquid medium is preferably non-aqueous, although water can sometimes be tolerated with blocked isocyanates.

In a preferred embodiment, the polyisocyanate crosslinking agent contains three isocyanate groups. A convenient source of triisocyanate functional compounds is the known isocyanurate derivative of diisocyanates. Isocyanurate derivatives of diisocyanates can be made by reacting the diisocyanate together with a suitable trimerization catalyst. An isocyanurate derivative is produced that contains an isocyanurate core with pendant organic chains terminated by three isocyanate groups. Several isocyanurate derivatives of diisocyanates are commercially available. In one preferred embodiment, the isocyanurate used is the isocyanurate of isophorone diisocyanate. In another preferred embodiment, the isocyanaurate of hexamethylene diisocyanate is used.

Examples of N-methyol crosslinking agents include dimethoxydihydroxy ethylene urea; N,N-dimethylol ethyl carbamate; tetramethylol acetylene diurea; dimethylol urone; dimethylol ethylene urea; dimethylol propylene urea; dimethylol adipic amide; and mixtures comprising two or more thereof.

Examples of keteneimine crosslinking agents include compounds of formula $Ph_2C=C=N-C_6H_4-N=C=CPh_2$ wherein each Ph independently is an optionally substituted phenyl group.

Examples of hydrazide crosslinking agents include malonic dihydrazide, ethylmalonic dihydrazide, succinic dihydrazide, glutaric dihydrazide, adipic dihydrazide, isophthalic dihydrazide, oxalyl dihydrazide and pimelic dihydrazide.

Commercially available highly reactive oxazoline crosslinking agents are available from, for example, Nippon Shokubai under the Epocross® trade mark. These include the emulsion type (e.g. the Epocross K-2000 Series, such as K-2010E, K-2020E and K-2030E) and the water-soluble types (e.g. the Epocross WS Series, such as WS-300, WS-500 and WS-700).

Examples of aziridine crosslinking agents include ethylene imine-based polyaziridines (e.g. PZ-28 and PZ-33 available from PolyAziridine LLC, Medford, N.J.); XC-103 tri-functional aziridines, XC-105 polyfunctional aziridines and Crosslinker XC-113 (available from Shanghai Zealchem Co., Ltd., China); polyfunctional aziridine liquid crosslinker SaC-100 (available from Shanghai UN Chemical Co., Ltd, China); The aziridines crosslinking agents disclosed in WO 2009/120420; NeoCryl® CX-100 (available from DSM NeoResins); Xama® polyfunctional aziridines (available from Lubrizol); trimethylolpropane tris(beta-aziridino)propionate, neopentylglycol di(beta-aziridino)propionate, glyceryl tris(beta-aziridino)propionate, pentaerythrityltetra(beta-aziridino)propionate, 4,4'-isopropylidenediphenol di(beta-aziridino)propionate, 4,4'-methylenediphenol di(beta-aziridino); and mixtures comprising two or more thereof.

Particularly preferred crosslinking agents are polyethylene glycol diglycidyl ether (e.g. having an average molecular weight 526, obtainable from Aldrich) and/or trimethylolpropane polyglycidyl ether (e.g. Denacol® EX-321, obtainable from Nagase Chemtex, with weight per epoxy of 140).

Preferred methods for making the self-dispersible pigment are described in WO2006/064193 and WO2010/038071. In essence, a dispersant having carboxy groups is adsorbed onto a pigment and then some (but not all) of the carboxy groups are crosslinked to give a pigment dispersion where the pigment is permanently trapped within the crosslinked dispersant. Self-dispersible pigments such as these (according to the present invention) are commercially available from FUJIFILM Imaging Colorants Limited as Pro-Jet® APD 1000 pigments.

Any suitable type of printing may be used in the printing process of the present invention.

For example, rotogravure, lithography, flexography, porous and screen printing, ink-jet printing, letterpress and tampography printing can all be used in the process of the present invention.

However, preferably the process for printing is a flexographic or ink-jet printing process and more preferably an ink-jet printing process.

Ink-jet printing is a non-impact printing technique in which droplets of an ink are ejected through fine nozzles onto a substrate without bringing the nozzles into contact with the substrate. There are basically three types of ink-jet printing:

i) Continuous ink-jet printing uses a pressurized ink source that produces a continuous stream of ink droplets from a nozzle. The droplets of ink are directed either thermally or by electrostatic means at a nominally constant distance from the nozzle. Those droplets which are not successfully deflected are recycled to the ink reservoir via a gutter.

ii) Drop-on-demand ink-jet printing where the ink is stored in a cartridge and fired from the print-head nozzle using a pressurization actuator (usually thermal or piezoelectric). With drop-on-demand printing only the drops that are required for printing are produced.

iii) Re-circulating ink-jet printing where the ink is continuously re-circulated in the print-head and (as in drop-on demand printing) only drops required for printing are drawn off to the nozzle.

Preferably the process for printing according to the present invention is a re-circulating ink-jet printing process.

Re-circulating ink-jet printers have found particular utility in the industrial sector. Industrial ink-jet printers are required to work at high speeds. Optimally a print-head for an industrial ink-jet printer will have multiple nozzles arranged at a high density to enable high productivity single-pass printing with acceptable print resolutions.

The process of the present invention may use any ink-jet printer with an ink re-circulating print-head. Preferably the print-head has an ink re-circulation channel in the ink supply system. This channel allows for fresh ink to be available for jetting and can be part of the ink supply system or even specially engineered channels which run behind the nozzle plate. It is preferred that the ink supply system runs behind the nozzle plate as this allows for the use of more volatile inks whilst not compromising restart/latency behaviour. Behind nozzle plate re-circulation is exemplified in commercially available FUJIFILM Dimatix print-heads such as Samba® or SG1024®.

Preferably, the ink to be used in the ink-jet printing process is a volatile water based ink which can be printed in line and dry quickly, either unassisted or with a low temperature drying process.

The ink for use in the process of the present invention preferably comprises:
(a) 0.1 to 10 parts of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
(b) 5 to 15 parts of one or more polar organic solvent(s) with a solubility parameter at 25° C. greater than 27.5;
(c) 0.1 to 5 parts of an acetylenic surfactant;
(d) 0.001 to 5 parts of biocide;
(e) 0 to 15 parts of a viscosity modifier;
(f) 0 to 5 parts of one or more organic solvents with a solubility parameter at 25° C. less than 27.5;

(g) 0 to 8 parts of a latex binder; and
(h) the balance to 100 parts water;

Component (b) may comprise any suitable polar organic solvent with a solubility parameter greater than 27.5 at 25° C.

Preferably component (b) comprises a protic polar organic solvent.

Suitable solvents include glycerol, 2-pyrrolidone, ethylene glycol, propylene glycol and diethylene glycol.

Preferably component (b) comprises 1 to 3 solvents selected from the list consisting of; glycerol, 2-pyrrolidone, ethylene glycol and diethylene glycol. More preferably component (b) comprises 2 or 3 solvents selected from the list consisting of; glycerol, 2-pyrrolidone, ethylene glycol and diethylene glycol. It is especially preferred that component (b) comprises 3 solvents selected from the list consisting of; glycerol, 2-pyrrolidone, ethylene glycol and diethylene glycol.

The solubility parameter is the standard Hildebrand solubility parameter which is expressed in mega Pascals. Values for the Hildebrand solubility parameters of solvents may be found in Barton, *Handbook of Solubility Parameters*, CRC Press, 1983.

Any acetylenic surfactant may be used as component (c). However, 2,4,7,9-tetramethyl-5-decyne-4,7-diol and ethylene oxide condensates thereof are preferred. These compounds are available as the Surfynol® range of surfactants from Air Products.

Mixtures containing different surfactants may be used.

Component (c) is preferably present in the composition in an amount of 0.01 to 3 parts, more preferably 0.2 to 2 parts and especially 0.5 to 1.5 parts.

The surfactant is a key component in the inks of the present invention.

Correct choice of both the surfactant and its concentration in a particular ink is essential in the ink-jetting effectively and in not wetting the face-plate of the print-head.

For component (d) any biocide (or mixture of biocides) which is stable in the ink may be used. It is particularly preferred that the biocide comprises 1,2-benzisothazolin-3-one which is available as a 20% active solution from Lonza as Proxel® GXL and Bioban®, DXN (2,6-dimethyl-1,3-dioxan-4-yl acetate), from Dow Chemical Company.

The viscosity modifier, component (e), is preferably selected from the group consisting of polyethers, (such as polyethylene glycol and poly(ethylene oxide)), cellulose polymers such as hydroxyethyl cellulose, hydroxypropyl cellulose and carboxymethyl cellulose, water-soluble acrylics, water-soluble polyesters, water-soluble polyurethanes, homopolymers of 2-ethyl-oxazoline (e.g. poly-2-ethyl-2-oxazoline), poly(vinyl alcohol) and poly(vinylpyrrolidones) and mixtures thereof.

Component (e) is preferably poly(ethylene glycol) or poly(ethylene oxide), an acrylic polymer or a polyurethane, including a hydrophobically modified polyurethane. More preferably component (e) is polyethylene glycol especially polyethylene glycol 20,000.

Component (e) is preferably present in the composition in an amount of from 0.1 to 12 parts and more preferably in an amount of from 5 to 10 parts.

Other polar solvents with a solubility parameter less than 27.5 at 25° C. may optionally be present in the ink. Preferably the inks of the present invention comprise less than 3 parts, more preferably less than 2 parts, especially less than 1 part and more especially are free from solvents with a solubility parameter less than 27.5 at 25° C. Thus, preferably component (f) is 0.

Component (g), the latex binder, is preferably a styrene butadiene, styrene acrylic or polyurethane latex binder.

The ink may contain more than one latex binder. The latex binders may differ in their properties, such as particle size, glass transition temperature or molecular weight.

Preferably component (g) is a styrene butadiene latex binder.

Preferably the styrene butadiene latex binder has a Tg in the range of from 0° C. to 120° C., more preferably in the range of from 100° C. to 110° C. and especially in the range of from 50° C. to 90° C.

The Tg is determined by Differential Scanning Calorimetry on the dried latex. The Tg is taken as being the midpoint value from a re-heat Differential Scanning Calorimetry scan (i.e. after an initial heat and cool).

Preferably the styrene butadiene latex binder is prepared by emulsion polymerisation.

The molecular weight of the styrene butadiene latex binder can be controlled by methods known in the art, for example, by use of a chain transfer agent (e.g. a mercaptan) and/or by control of initiator concentration in the case of emulsion polymerisation, and/or by heating time. Preferably the styrene butadiene latex binders have a molecular weight of greater than 20,000 Daltons and more preferably of greater than 100,000 Daltons. It is especially preferred that the molecular weight of the styrene butadiene latex binder is greater than 200,000 Daltons.

The styrene butadiene latex binder may be monomodal, preferably with an average particle size of below 1000 nm, more preferably below 200 nm and especially below 150 nm. Preferably, the average particle size of the styrene butadiene latex binder is at least 20 nm, more preferably at least 50 nm. Thus, the styrene butadiene latex binder may preferably have an average particle size in the range of from 20 to 200 nm and more preferably in the range of from 50 to 150 nm. The average particle size of the styrene butadiene latex binder may be measured using photon correlation spectroscopy The styrene butadiene latex binder may also show a bimodal particle size distribution. This may be achieved either by mixing two or more latexes of different particle size, or by generating the bimodal distribution directly, for example by two-stage polymerisation. Where a bimodal particle size distribution is used it is preferred that the lower particle size peak is in the range 20-80 nm, and the higher particle size peak is in the range 100-500 nm. It is further preferred that the ratio of the two particle sizes is at least 2, more preferably at least 3 and most preferably at least 5.

The molecular weight of the styrene butadiene latex binder may be determined by Gel Permeation Chromatography against polystyrene standards using an Agilent HP1100 instrument with THF as eluent and PL Mixed Gel C columns.

The styrene butadiene latex binder once formed is preferably screened to remove oversized particles prior to use, for example through a filter having an average pore size below 3 μm, preferably 0.3 to 2 μm, especially 0.5 to 1.5 μm. The styrene butadiene latex binder may be screened before, during or after it is mixed with other components to form the ink.

Commercially available styrene butadiene latex binders may be used in the ink according to the present invention.

Examples of commercially available styrene butadiene latex binders which can be used in the ink of the pre present invention include styrene butadiene latexes in the Rovene® range supplied by Mallard Creek polymers, particularly Rovene 5499 and Rovene 4111 and especially Rovene 4111.

Component (g) is preferably in the range of from 2 to 6 parts.

The ink jet printing ink preferably has a surface tension from 20 to 65 dynes/cm, more preferably from 20 to 50 dynes/cm, especially 32 to 42 dynes/cm and more especially 32 to 38 dynes/cm, when measured at 25° C. using Kruss K11 tensiometer.

Preferably, the ink composition has been filtered through a filter having a mean pore size of less than 10 microns, more preferably less than 5 microns and especially less than 1 micron.

The ink has a pH in the range of from 7.5 to 9.5 and more preferably in the range of from 8.2 to 9.0. The pH may be adjusted by means of a suitable buffer.

Preferably ink-jet printing ink of the first aspect of the invention is applied at a temperature in excess of 30° C.

Preferably the drop volume of the ink applied by the ink-jet printer is in the range of from 20 to 100 pl.

Recirculating print heads of the type preferred in the present invention are usually equipped with a reservoir heater and a thermistor to control the jetting temperature. It is preferred that the viscosity of the ink-jet printing ink at the jetting temperature is in the range of from 8 to 20 mPa s and more preferably in a range of from 11 to 14 mPa·s at 32° C. when measured using a Brookfield spindle SC4-18 at 150 rpm.

In addition to the above mentioned components, the ink composition may optionally comprise one or more ink additives. Preferred additives suitable for ink-jet printing inks are rheology modifiers, corrosion inhibitors and chelating agents. Preferably, the total amount of all such additives is no more than 10 parts by weight. These additives are added to and comprise part of component (i), the water added to the ink.

In a first preferred embodiment the ink comprises:
(1) 0.5 to 7.5 parts of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
(2) 1 to 10 parts of a first protic polar organic solvent with a solubility parameter at 25° C. greater than 27.5;
(3) 1 to 10 parts of a second protic polar organic solvent with a solubility parameter at 25° C. greater than 27.5;
(4) 1 to 10 parts of a third polar protic organic solvent with a solubility parameter at 25° C. greater than 27.5;
(5) 0.2 to 2 parts of an acetylenic surfactant;
(6) 0.001 to 2 parts of biocide;
(7) 1 to 15 parts of a viscosity modifier;
(8) the balance to 100 parts water.

In this first preferred embodiment the ink more preferably comprises:
($1^1$) 2.5 to 7.5 parts of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
($2^1$) 1 to 10 parts of glycerol;
($3^1$) 0.5 to 5 parts of ethylene glycol;
($4^1$) 1 to 10 parts of 2-pyrrolidone;
($5^1$) 0.2 to 2 parts of an acetylenic surfactant;
($6^1$) 0.001 to 2 parts of biocide;
($7^1$) 1 to 15 parts of polyethylene glycol 20,000;
($8^1$) the balance to 100 parts water.

In a second preferred embodiment the ink comprises:
($1^a$) 0.5 to 7.5 parts of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
($2^a$) 1 to 10 parts of a first protic polar organic solvent with a solubility parameter at 25° C. greater than 27.5;
($3^a$) 1 to 10 parts of a second protic polar organic solvent with a solubility parameter at 25° C. greater than 27.5;
($4^a$) 1 to 10 parts of a third polar protic organic solvent with a solubility parameter at 25° C. greater than 27.5;
($5^a$) 0.2 to 2 parts of an acetylenic surfactant;
($6^a$) 0.001 to 2 parts of biocide;
($7^a$) 2 to 6 parts of a latex binder;
($8^a$) 0 to 15 parts of a viscosity modifier and
($9^a$) the balance to 100 parts water.

In the second preferred embodiment the ink more preferably comprises:
($1^b$) 2.5 to 7.5 parts of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
($2^b$) 1 to 10 parts of glycerol;
($3^b$) 0.5 to 5 parts of ethylene glycol;
($4^b$) 1 to 10 parts of 2-pyrrolidone;
($5^b$) 0.2 to 2 parts of an acetylenic surfactant;
($6^b$) 0.001 to 2 parts of biocide;
($7^b$) 2 to 6 parts of a styrene butadiene latex binder;
($8^b$) 1 to 15 parts of polyethylene glycol 20,000
($8^b$) the balance to 100 parts water.

The process of the present invention may be used to print on any water-soluble material.

A water-soluble material is any material which is able to dissolve within 90 seconds at 20° C. under the following conditions.

Three test samples, 3.8 cm by 3.2 cm, are cut from a film. Each test specimen is then secured in a 35 mm slide mount.

A breaker is filled with 500 ml of water at 20° C. and the level of water in the beaker marked. The beaker is then set on a magnetic stirrer a stir bar added and the speed adjusted until a vortex develops which is approximately one-fifth the height of the water column. The depth of the vortex is marked.

The 35 mm slide mount, holding the sample, is secured to a holder above the beaker by means of an alligator clamp such that the long end of the slide mount is parallel to the water surface. The depth adjuster of the holder should be set so that when the slide is dropped, the end of the clamp will be 0.6 cm below the surface of the water. One of the short sides of the slide mount should be next to the side of the beaker with the other positioned directly over the centre of the stirring rod such that the film surface is perpendicular to the flow of the water.

In one motion the secured slide and clamp is dropped into the water and the timer started. Disintegration occurs when the film breaks apart. When all visible film is released from the slide mount, the slide is raised out of the water while continuing to monitor the solution for undissolved film fragments. Dissolution occurs when all film fragments are no longer visible and the solution becomes clear.

The individual and average disintegration and dissolution time are recorded.

A detailed discussion of the test method can be found in U.S. Pat. No. 6,787,512.

Preferably the water-soluble material comprises a polymeric material.

Suitable polymers and copolymers include polyvinyl alcohols; polyvinyl pyrrolidone; polyalkylene oxides; acrylamide; acrylic acid; cellulose; cellulose ethers; cellulose esters; cellulose amides; polyvinyl acetates; polycarboxylic acids and salts; polyaminoacids or peptides; polyamides; polyacrylamide; copolymers of maleic/acrylic acids; polysaccharides, including starch; gelatine; natural gums, such as xanthum and carragum; polyacrylates and water-soluble acrylate copolymers; methylcellulose; carboxymethylcellulose sodium; dextrin, ethylcellulose; hydroxyethyl cellulose; hydroxypropyl methylcellulose; maltodextrin and polymethacrylates.

More preferably the water-soluble material comprises a polymeric material selected from polyvinyl alcohols, polyvinyl alcohol copolymers and hydroxypropyl methyl cellulose (HPMC), and combinations thereof. Preferably, the level of polymer in the water-soluble material is at least 60%.

The polymer component of the water-soluble material preferably has an average molecular weight of from 1,000 to 1,000,000, more preferably of from 10,000 to 300,000 and especially of from 20,000 to 150,000.

Mixtures of polymers can be used in the water-soluble material. This can be beneficial to control the mechanical and/or dissolution properties of the water-soluble material. Thus, it is possible to mix a polymer with a high water-solubility with a polymer with a high mechanical strength.

Also suitable are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol.

In a preferred embodiment the polymers are of from 60% to 98% hydrolysed, more preferably of from 80% to 90% hydrolysed, to improve the dissolution characteristics of the material.

The water-soluble material can also comprise one or more additive ingredients. For example, it can be beneficial to add plasticisers, for example glycerol, ethylene glycol, diethyleneglycol, propylene glycol, sorbitol and mixtures thereof.

Preferably the water-soluble material is a polyvinyl alcohol (PVA) film. Examples of preferred PVA films include Monosol M8630, as sold by MonoSol, PT film and K-series films supplied by Aicello and VF-HP film supplied by Kuraray.

In the process for printing of the present invention the water-soluble material is a unit-dose pouch containing an agrochemical, water-treatment chemical or a detergent especially a detergent. The water-soluble unit-dose pouch may be printed on prior to filling the pouch or after formation of a dose.

A second aspect of the invention provides an ink-jet ink suitable for use in an ink-jet printing process of the present invention.

In a first preferred embodiment the ink comprises:
(1) 0.5 to 7.5 parts of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
(2) 1 to 10 parts of a first protic polar organic solvent with a solubility parameter at 25° C. greater than 27.5;
(3) 1 to 10 parts of a second protic polar organic solvent with a solubility parameter at 25° C. greater than 27.5;
(4) 1 to 10 parts of a third polar protic organic solvent with a solubility parameter at 25° C. greater than 27.5;
(5) 0.2 to 2 parts of an acetylenic surfactant;
(6) 0.001 to 2 parts of biocide;
(7) 1 to 15 parts of a viscosity modifier;
(8) the balance to 100 parts water.

In this first preferred embodiment the ink more preferably comprises:
($1^1$) 2.5 to 7.5 parts of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
($2^1$) 1 to 10 parts of glycerol;
($3^1$) 0.5 to 5 parts of ethylene glycol;
($4^1$) 1 to 10 parts of 2-pyrrolidone;
($5^1$) 0.2 to 2 parts of an acetylenic surfactant;
($6^1$) 0.001 to 2 parts of biocide;
($7^1$) 1 to 15 parts of polyethylene glycol 20,000;
($8^1$) the balance to 100 parts water.

In a second preferred embodiment the ink comprises:
($1^a$) 0.5 to 7.5 parts of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
($2^a$) 1 to 10 parts of a first protic polar organic solvent with a solubility parameter at 25° C. greater than 27.5;
($3^a$) 1 to 10 parts of a second protic polar organic solvent with a solubility parameter at 25° C. greater than 27.5;
($4^a$) 1 to 10 parts of a third polar protic organic solvent with a solubility parameter at 25° C. greater than 27.5;
($5^a$) 0.2 to 2 parts of an acetylenic surfactant;
($6^a$) 0.001 to 2 parts of biocide;
($7^a$) 2 to 6 parts of a latex binder;
($8^a$) 0 to 15 parts of a viscosity modifier and
($9^a$) the balance to 100 parts water.

In the second preferred embodiment the ink more preferably comprises:
($1^b$) 2.5 to 7.5 parts of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
($2^b$) 1 to 10 parts of glycerol;
($3^b$) 0.5 to 5 parts of ethylene glycol;
($4^b$) 1 to 10 parts of 2-pyrrolidone;
($5^b$) 0.2 to 2 parts of an acetylenic surfactant;
($6^b$) 0.001 to 2 parts of biocide;
($7^b$) 2 to 6 parts of a styrene butadiene latex binder;
($8^b$) 1 to 15 parts of polyethylene glycol 20,000
($8^b$) the balance to 100 parts water.

The ink components in the ink of the second aspect of the invention are as described and preferred in the first aspect of the invention.

A third aspect of the present invention provides a water-soluble material printed by a process as described and preferred in the first aspect of the invention or with an ink as described and preferred in the second aspect of the invention.

Preferably in the third aspect of the invention the water-soluble material is printed by an ink-jet printing process and more preferably by an ink-jet printing process utilising a re-circulating ink-jet printer.

More preferably in the third aspect of the invention the water-soluble material has been printed by an ink-jet printing process utilising a re-circulating ink-jet printer and the ink as described and preferred in the second aspect of the invention.

The water-soluble material is as described and preferred in the first aspect of the invention. Thus, the printed water-soluble material is preferably a polyvinyl alcohol film.

It is especially preferred that the water-soluble material is a unit-dose pouch either prior to or after filling the unit-dose pouch. Preferably the unit-dose pouch is a polyvinyl alcohol pouch more preferably filled with an agrochemical, water-treatment chemical or detergent.

According to a fourth aspect of the present invention there is provided an ink-jet printer ink container (e.g. a cartridge or a larger ink tank), comprising an ink as defined in the second aspect of the present invention A fifth aspect of the present invention provides an ink-jet printer with a re-circulating printer head, as described in the first aspect of the invention, containing an ink, as described in the second aspect of the invention.

A sixth aspect of the invention provides an ink-set comprising two or more different coloured inks as described and preferred in the second aspect of the invention. The ink-set of the sixth aspect of the invention may contain inks other than those defined and described in the second aspect of the invention.

In one preferred embodiment the sixth aspect of the invention comprises an ink-set comprising a black ink, a cyan ink, a yellow ink and a magenta ink wherein the inks are as described and preferred in the second aspect of the invention. Preferably the pigment in the black ink is carbon black; in the cyan ink is Pigment Blue 15:3; in the yellow ink is Pigment Yellow 74; and in the magenta ink is Pigment Red 122.

A second preferred embodiment of the ink-set of the sixth aspect of the invention provides an ink-set comprising a black ink, red ink, and a white ink wherein the black ink and red ink are as described in and preferred in the second aspect of the invention. Preferably the pigment in the black ink is carbon black and in the red ink is a mixture of Pigment Red 122 and Pigment Yellow 74 and the white ink comprises titanium dioxide.

Preferably the white ink comprises:
(a) from 1 to 25 parts of titanium dioxide pigment;
(b) from 0 to 8 parts of a styrene butadiene latex binder or styrene acrylic binder;
(c) from 0 to 8 parts of a polyurethane latex binder;
(d) from 0 to 5 parts of a glycol selected from the group consisting of ethylene glycol, diethylene glycol, propylene glycol, dipropylene glycol or triethylene glycol;
(e) from 1 to 10 parts of 2-pyrrolidone;
(f) from 1 to 10 parts of glycerol;
(g) from 0.01 to 2 parts of an acetylenic surfactant;
(h) from 0.001 to 5 parts of biocide;
(i) from 0 to 10 parts of a viscosity modifier; and
(j) the balance to 100 parts water; provided that (b) plus (c) is greater than 0.

More preferably the white ink comprises:
(a') from 5 to 20 parts of titanium dioxide pigment;
(b') from 2 to 6 parts of a styrene butadiene latex binder;
(c') from 0.5 to 2.5 parts of ethylene glycol;
(d') from 2.5 to 7.5 parts of 2-pyrrolidone;
(e') from 2 to 7.5 parts of glycerol;
(f') from 0.05 to 1.0 parts of an acetylenic surfactant;
(g') from 0.001 to 2 parts of biocide;
(h') the balance to 100 parts water.

In the white ink, the titanium dioxide may be in rutile or anatase form or a mixture of the two forms.

Preferably the titanium dioxide pigment is a surface treated titanium dioxide pigment.

The titanium dioxide pigment particles can have a wide variety of average particle sizes of about 1 micron or less, depending on the desired end use application of the ink.

The titanium dioxide pigment is in and of itself white in color.

For applications demanding high hiding or decorative printing applications, the titanium dioxide particles preferably have a Z average mean particle diameter of less than 1 micron (1000 nm). Preferably, the particles have a Z average mean particle diameter of from 50 to 950 nm, more preferably from 75 to 750 nm, and still more preferably from 100 to 500 nm. It is especially preferred that the titanium dioxide particles have a Z average mean particle diameter of from 125 to 350 nm and more especially of from 150 to 300 nm. The Z average mean particle diameter may be readily measured using a Zetasizer® from Malvern Instruments. Titanium dioxide particles of this size are commonly called pigmentary titanium dioxide.

For applications demanding white color with some degree of transparency, the pigment preference is "nano" titanium dioxide. "Nano" titanium dioxide particles typically have a Z average mean particle diameter ranging from about 10 to about 200 nm, preferably from about 20 to about 150 nm, and more preferably from about 35 to about 75 nm. An ink comprising nano titanium dioxide can provide improved chroma and transparency, while still retaining good resistance to light fade and an appropriate hue angle.

In addition, unique advantages may be realized with multiple particle sizes, such as opaqueness and UV protection. These multiple sizes can be achieved by adding both a pigmentary and a nano grade of titanium dioxide.

The Zetasizer polydispersity index, measured using a Zetasizer from Malvern Instruments, of the titanium dioxide particles in the ink is preferably less than 0.2.

The titanium dioxide pigment is preferably incorporated into an ink formulation via a slurry concentrate composition. The amount of titanium dioxide present in the slurry composition is preferably from about 20 wt % to about 80 wt %, based on the total slurry weight.

The titanium dioxide pigment may be substantially pure titanium dioxide or may comprise other metal oxides. These other metal oxides are preferably one or more selected from the group consisting of silica, alumina, zirconia, titanate and mixtures thereof. Other metal oxides may become incorporated into the pigment particles, for example, by co-oxidizing or co-precipitating titanium compounds with other metal compounds. If the titanium dioxide pigment comprises co-oxidized or co-precipitated metals, they are preferably present as the metal oxide in an amount from 0.1 wt % to 20 wt %, more preferably from 0.5 wt % to 5 wt %, and still more preferably from 0.5 wt % to 1.5 wt %, based on the total titanium dioxide pigment weight.

In a preferred embodiment the surface of the surface treated titanium dioxide pigment is coated with an inorganic compound selected from the group consisting of silica, alumina, alumina-silica or zirconia. More preferably the surface of the surface treated titanium dioxide is treated with alumina, silica or a mixture thereof. Such coatings may be present in an amount of from 0.1 wt % to 10 wt %, and preferably from 0.5 wt % to 3 wt %, based on the total weight of the titanium dioxide.

The surface of the surface treated titanium dioxide may also carry one or more organic surface coatings. The organic surface coatings are, for example, selected from the group consisting of carboxylic acids, silanes, siloxanes and hydrocarbon waxes, and their reaction products. The amount of organic surface coating generally ranges from 0.01 wt % to 6 wt %, preferably from 0.1 wt % to 3 wt % and more preferably from 0.5 wt % to 1.5 wt % based on the total weight of the titanium dioxide.

Preferred surface treatments for the surface treated titanium dioxide include alumina, silicate, methicone, polydimethylsiloxyethyl dimethicone, triethoxysilylethyl polydimethylsiloxyethyl dimethicone, PEG-10 dimethicone, PEG-9 polydimethylsiloxyethyl dimethicone, PEG-8 methyl ether triethoxysilane, isopropyl titanium triisostearate and triethoxycaprylylsilane. The surface treatments for the surface treated titanium dioxide can also be a hybrid treatments such as polyhydroxystearic acid and silane (especially triethoxycaprylylsilane and polyhydroxystearic acid), isopropyl titanium triisostearate and alumina and triethoxysilylethyl polydimethylsiloxyethyl dimethicone, isopropyl titanium triisostearate and triethoxysilylethyl polydimethylsiloxyethyl dimethicone.

In one preferred embodiment the surface treated titanium dioxide pigment is treated so it has a hydrophilic character.

In a preferred embodiment the surface of the surface treated titanium dioxide pigment is treated with alumina, silica or a mixture thereof.

Preferably the surface treated titanium dioxide is a cosmetic grade material.

The titanium dioxide pigment is preferably present in the range of from 2 to 23 parts and more preferably of from 5 to 20 parts.

The other components are as described and preferred in the first aspect of the invention.

A third preferred embodiment of the ink-set of the sixth aspect of the invention provides an ink-set comprising a black ink, a cyan ink, a magenta ink, a yellow ink, a red ink and a white ink. In the third preferred embodiment the black ink, cyan ink, magenta ink, yellow ink and red ink are as described and preferred in the first and second embodiments.

EXAMPLES

The present invention will now be illustrated by the following examples in which all parts are by weight unless stated to the contrary.

Preparation of the Self-Dispersible Pigment
Preparation of the Dispersant

The dispersant was prepared by solution copolymerisation of benzyl methacrylate and methacrylic acid at weight proportions of 78.5 to 21.5 respectively. The dispersant was isolated in the form of a dry solid and had an acid value of 2.5 mmoles of acid groups/g of dispersant.

Preparation of the Dispersant Solution

The dispersant (200 parts) was dissolved in water to make up to 1000 parts and neutralised with potassium hydroxide aqueous solution to give an aqueous solution having a pH of about 9.

Preparation of Mill-Bases
Black Mill-Base

Pigment powder (90 parts of a Carbon Black pigment) and the dispersant solution (180 parts) were mixed together to form a pre-mixture. Water was added to the pre-mixture as appropriate to provide a suitable viscosity for mixing and milling.

The premixture was thoroughly mixed together. After mixing the mixture was transferred to a bead mill containing milling beads. The mixture was then milled for several hours until the desired particle size of approximately 110 nm had been reached. The particle size was the Z averaged particle size as measured by a Malvern Zetasizer™

The milling beads were then removed from the milled mixture to give the Black Mill-base.

Magenta Mill-Base

The Magenta Mill-base was prepared in the same way as the Black Mill-base except that a magenta pigment (85 parts of C.I. Pigment 122) and dispersant solution (1) (127.5 parts) were used. For the Magenta Mill-base the milling was continued for several hours until a particle size of approximately 120 nm had been obtained. The particle size was the Z averaged particle size as measured by a Malvern Zetasizer™.

The milling beads were then removed from the milled mixture to give the Magenta Mill-base.

Yellow Mill-Base

The Yellow Mill-base was prepared in the same way as the Black Mill-base except that a yellow pigment (100 parts of C.I. Pigment Yellow 74) and dispersant solution (250 parts) were used. For the Yellow Mill-base the milling was continued for several hours until a particle size of approximately 120 nm had been obtained. The particle size was the Z averaged particle size as measured by a Malvern Zetasizer™.

The milling beads were then removed from the milled mixture to give the Yellow Mill-base.

Cyan Mill-Base

The Cyan Mill-base was prepared in the same way as the Black Mill-base except that a cyan pigment (150 parts of a C.I. Pigment Blue 15:3) and dispersant solution (225 parts) were used. For the Cyan Mill-base the milling was continued for several hours until a particle size of approximately 120 nm had been obtained. The particle size was the Z averaged particle size as measured by a Malvern Zetasizer™.

The milling beads were then removed from the milled mixture. This resulted in Cyan Mill-base (1).

Preparation of Encapsulated Pigment

The mill-bases prepared above were adjusted to a solids content of about 10% by weight by the addition of pure water.

The dispersants in each of the mill-bases were then cross-linked using a cross-linking agent, (Denacol™ EX-321 obtained from Nagase ChemteX, with weight per epoxy=140, hereafter abbreviated as EX-321). This cross-linked the carboxylic acid groups in the dispersant and thereby encapsulated the pigment. The cross-linking reaction was controlled by the presence of a small amount of boric acid (obtained from Aldrich). The cross-linking reaction was effected by heating the above described mixture to a temperature of about 65° C. for 5 hours. This prepared a range of different Encapsulated pigments with the references as indicated in column 1 of Table 1.

TABLE 1

| | Cross-linking | | |
|---|---|---|---|
| Encapsulated pigment | Mill-base (parts) | Cross-linking agent (parts) | Boric acid parts |
| EPS 1 | Cyan Mill-base 1 (3) | EX321 (6.3) | 2.78 |

TABLE 1-continued

Cross-linking

| Encapsulated pigment | Mill-base (parts) | Cross-linking agent (parts) | Boric acid parts |
|---|---|---|---|
| EPS 2 | Magenta Mill-base 1 (3) | EX321 (3.57) | 1.58 |
| EPS 3 | Yellow Mill-base 1 (3) | EX321 (4.9) | 2.16 |
| EPS 4 | Black Mill-base 1 (3) | EX321 (5.04) | 2.23 |

Purification of the Encapsulated Pigment

The encapsulated pigments prepared above in were each purified by means of ultrafiltration. The encapsulated pigment dispersions were diafiltered with pure water. The ultrafiltration membrane was then used to concentrate the encapsulated dispersion back to a solids content of around 10 to 13% by weight.

Example Inks

Example 1

The present invention will now be illustrated by the following examples in which all parts are by weight unless stated to the contrary.

The self-dispersible pigment used were the Pro-Jet® APD 1000 pigment dispersions which are available from FUJIFILM Imaging Colorants Limited.

Surfynol® 440 is an acetylenic surfactant from Air Products.

Rovene® 4111 is a styrene butadiene dispersion from Mallard Creek Polymers. The Tg of Rovene 6102 is 20° C. and the acid number is 50 mgKOH/g. 1,2-Benzisothazolin-3-one was obtained as Proxel® GXL (20% solution) from Lonza.

PEG 20K is polyethylene glycol 20,000.

Ink Example 1—Red Ink

| Component | Formulation At 100% Active (Wt %) |
|---|---|
| Projet APD 1000 Magenta | 3.35 |
| Projet ADP 1000 Yellow | 0.65 |
| Glycerol | 3.75 |
| Ethylene glycol | 1.25 |
| 2 Pyrrolidone 95% | 5.00 |
| Surfynol 440 | 0.24 |
| 1,2-Benzisothazolin-3-one | 0.015 |
| Rovene 4111 | 5.50 |
| PEG 20K | 7.00 |
| DI Water | to 100 |
| Properties | |
| pH | 8.84 |
| Viscosity at 32° C. cP | 12.68 |
| Surface Tension D/cm | 34.48 |

Ink Example 2—Black Ink

| Component | Formulation At 100% Active (Wt %) |
|---|---|
| Projet APD 1000 Black | 4.00 |
| Glycerol | 3.75 |
| Ethylene glycol | 1.25 |
| 2 Pyrrolidone 95% | 5.00 |
| Surfynol 440 | 0.24 |
| 1,2-Benzisothazolin-3-one | 0.015 |
| Rovene 4111 | 5.50 |
| PEG 20K | 6.45 |
| DI Water | to 100 |
| Properties | |
| pH | 8.85 |
| Viscosity at 32° C. cP | 12.68 |
| Surface Tension D/cm | 35.8 |

The inks were printed through a StarFire® SG1024 re-circulating print head from FUJIFILM Dimatix. The StarFire® SG1024 re-circulating print head is commonly only used with non-aqueous inks due to a tendency of its face plate to "wet" when used with aqueous inks, thus adversely effecting printer performance.

However the example ink printed without any problems. The print head was photographed with a JetXpert drop watcher. There was no evidence of any face plate wetting with any of the inks of the present invention.

The sustainability of the inks when printed through the StarFire SG1024 print head was evaluated by printing an image with a nozzle check pattern combined with a solid block. The solid block of color measured 30 mm in length, this value is later used in calculating the longer term feathering/latency effect. The nozzle test pattern is used to quantify nozzles which drop out over the course of the test.

After 15 minutes no significant degradation was observed and no missing nozzles were observed.

The latency of the inks in the StarFire SG1024 print head was evaluated by printing an image file that consists of a series of lines and block. Each block is timed to print 1 second from the previous block, the last block representing 6 seconds. For each block, the top portion should be clearly printed as it represent a baseline if there are latency problems the lower section will have a feathered appearance.

After 6 seconds no latency problems were seen with either ink.

PVA Dissolution Test

The printed PVA substrate was dissolved in water with continuous stirring. The solution was dissolved and filtered using a 0.3 micron filter paper. The particles on the filter paper were assessed by examination under a microscope and particle size measurements were carried out on the dispersed particles.

Rub Test

A lint free wipe was soaked in Persan® detergent and then gently rubbed against the PVA print sample (5 to 7 times). No significant transfer was observed.

Print Robustness Against Detergent

The PVA print was soaked in Persan detergent at 5° C., 25° C., 40° C. and 60° C. respectively. A comparative PVA print was printed using a white ink minus the latex component.

While the Example inks showed an excellent performance the white ink lacking latex binder peeled off from the substrates within a few hours.

Ink Stain Test

A test image was printed on PVA substrates using the different ink samples. The printed sample was stapled between 2 pieces of fabric and stapled. The sample was placed in water at 5° C. in water in the presence or 2 ml/L detergent solution with continuous stirring for 30 minutes.

When the PVA substrate had dissolved the test fabric was evaluated for any visual stain. The test was repeated at different temperatures; 25° C., 40° C. and 60° C.

The fabrics used had a dimension of 4×11 cm and were obtained from Testfabrics, inc., PA, USA. Twelve different fabrics were evaluated. They were Filament Acetate, SEF (Modacrylic), Filament Triacetate, Bleached Cotton, Creslan 61 (Acrylic), Dacron 54 (Polyester), Dacron 64 (Polyester), Nylon 66 (Polyamide), Orlan 75 (Acrylic), Spun Silk, Polypropylene (Polyolefin), Viscose (Rayon) and Wool (Worsted). A black test fabric was used to test the staining for white ink.

Image Quality

PVA films typically have a matt and glossy side. The red Example Ink 1 and black Example Ink 2 were printed onto the glossy and matt sides of M8630 PVA from Monosol. The print quality was then evaluated and there was no discernible difference between the L*a*b* parameters of the prints on the matt and glossy sides.

Ink-Set Example

An ink set was prepared using the inks shown in Table 1. The inks of the ink-set were printed onto various PVA films sourced from Monosol and Aicello using an ink-jet printer with a StarFire SG1024 print head. All prints were of an acceptable quality.

TABLE 1

Ink Set Example

| Component | Black Ink | Cyan Ink | Magenta Ink | Yellow Ink | Red Ink | White Ink |
|---|---|---|---|---|---|---|
| PEG 20K | 6.45 | 6.50 | 6.50 | 6.50 | 7.00 | 6.30 |
| 2-Pyrrolidone | 5.00 | 5.00 | 5.00 | 5.00 | 5.00 | 5.00 |
| Ethylene Glycol | 1.25 | 1.25 | 1.25 | 1.25 | 1.25 | 1.25 |
| Glycerol | 3.75 | 3.75 | 3.75 | 3.75 | 3.75 | 3.75 |
| Surfynol 440 | 0.24 | 0.24 | 0.24 | 0.24 | 0.20 | 0.30 |
| Proxel GXL | 0.015 | 0.015 | 0.015 | 0.015 | 0.015 | 0.015 |
| Pigment Dispersion I | 4.00 | 4.00 | 5.00 | 4.00 | 3.35 | 12.00 |
| Pigment Dispersion II | — | — | — | — | 0.65 | — |
| Rovene 4111 (Tg = 69° C.) | 4.00 | 4.00 | 4.00 | 4.00 | 4.00 | 4.00 |
| DI Water | to 100% | to 100% | to 100% | to 100% | to 100% | to 100% |

TABLE 2

Ink set ink properties

| Component | Black Ink | Cyan Ink | Magenta Ink | Yellow Ink | Red Ink | White Ink |
|---|---|---|---|---|---|---|
| Foam | No | No | No | No | No | No |
| pH | 8.90 | 8.89 | 8.92 | 8.75 | 8.84 | 8.48 |
| Surface Tension (Dyne/cm) | 33.29 | 33.75 | 33.49 | 32.90 | 34.48 | 33.62 |
| Viscosity (cPs) @ 32 C. 11.0-13.0 | 15.88 | 15.51 | 14.47 | 15.45 | 15.34 | 15.14 |

The invention claimed is:

1. A process for printing on a water-soluble material using an ink comprising
   ($1^1$) 2.5 to 7.5 parts of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
   ($2^1$) 1 to 10 parts of glycerol;
   ($3^1$) 0.5 to 5 parts of ethylene glycol;
   ($4^1$) 1 to 10 parts of 2-pyrrolidone;
   ($5^1$) 0.2 to 2 parts of an acetylenic surfactant;
   ($6^1$) 0.001 to 2 parts of biocide;
   ($7^1$) 1 to 15 parts of polyethylene glycol 20,000;
   ($8^1$) the balance to 100 parts water.

2. The process for printing on a water-soluble material as claimed in claim 1 wherein the self-dispersible pigment comprises one or more of Carbon Black; Pigment Blue 15:3; Pigment Yellow 74 and Pigment Red 122.

3. The process for printing on a water-soluble material as claimed in claim 1 wherein the carboxy-functional dispersant comprises benzyl methacrylate.

4. The process for printing on a water-soluble material as claimed in claim 1 wherein the carboxy-functional dispersant is a copolymer comprising:
   (i) from 75 to 97 parts of one or more hydrophobic ethylenically unsaturated monomers comprising at least 50 parts of benzyl methacrylate;
   (ii) from 3 to 25 parts of one or more hydrophilic ethylenically unsaturated monomers having one or more carboxy groups; and
   (iii) 0 to 1 part of hydrophilic ethylenically unsaturated monomers having one or more hydrophilic non-ionic groups;
   wherein the parts are by weight.

5. The process for printing on a water-soluble material as claimed in claim 1 wherein the crosslinking agent has at least two epoxy groups.

6. The process for printing on a water-soluble material as claimed in claim 1 wherein the water-soluble material is a polyvinyl alcohol film.

7. The process for printing on a water-soluble material as claimed in claim 1 wherein the process for printing is an ink-jet printing process.

8. A water-soluble material printed by an ink-jet printing process as described in claim 7.

9. A water-soluble material printed by a process as described in claim 1.

10. The water-soluble material as claimed in claim 9 which is a unit-dose pouch either prior to or after filling the unit-dose pouch.

11. The process for printing on a water-soluble material as claimed in claim 1 wherein the ink further comprises 2 to 6 parts of a styrene butadiene latex binder.

12. An ink-jet ink comprising:
- ($1^1$) 2.5 to 7.5 parts of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
- ($2^1$) 1 to 10 parts of glycerol;
- ($3^1$) 0.5 to 5 parts of ethylene glycol;
- ($4^1$) 1 to 10 parts of 2-pyrrolidone;
- ($5^1$) 0.2 to 2 parts of an acetylenic surfactant;
- ($6^1$) 0.001 to 2 parts of biocide;
- ($7^1$) 1 to 15 parts of polyethylene glycol 20,000;
- ($8^1$) the balance to 100 parts water.

13. An ink-set comprising two or more different coloured ink-jet inks as described in claim 12.

14. An ink-set comprising a black ink, a cyan ink, a yellow ink and a magenta ink wherein the inks are as described in claim 12 and wherein the pigment in the black ink is carbon black; in the cyan ink is Pigment Blue 15:3; in the yellow ink is Pigment Yellow 74; and in the magenta ink is Pigment Red 122.

15. An ink-set comprising a black ink, red ink, and a white ink wherein the black ink and red ink are as described in claim 12 and wherein the pigment in the black ink is Carbon Black and in the red ink is a mixture of Pigment Red 122 and Pigment Yellow 74 and the white ink comprises a dispersible form of titanium dioxide.

16. The ink-jet ink as claimed in claim 12 wherein the ink further comprises 2 to 6 parts of a styrene butadiene latex binder.

* * * * *